United States Patent [19]

De Wit

[11] Patent Number: 5,559,401
[45] Date of Patent: Sep. 24, 1996

[54] COLOR DISPLAY DEVICE COMPRISING A COLOR DISPLAY TUBE AND A DELAYING DEMAGNETIZING DEVICE

[75] Inventor: Hendrik J. De Wit, Eindhoven, Netherlands

[73] Assignee: U.S. Philips Corporation, New York, N.Y.

[21] Appl. No.: 539,143

[22] Filed: Oct. 4, 1995

[30] Foreign Application Priority Data

Oct. 21, 1994 [EP] European Pat. Off. ............ 94203072

[51] Int. Cl.⁶ .................................................. H01J 29/06
[52] U.S. Cl. ................... 315/8; 315/85; 361/150
[58] Field of Search ............... 315/8, 85; 361/139, 361/149, 150

[56] References Cited

U.S. PATENT DOCUMENTS

| | | | |
|---|---|---|---|
| 3,965,386 | 6/1976 | Duistermaat et al. | 315/8 |
| 5,499,156 | 3/1996 | Bentley | 315/8 |

FOREIGN PATENT DOCUMENTS 6905722  10/1969  Netherlands.

OTHER PUBLICATIONS

Blaha "Degaussing Circuits For Color Television Receivers" IEEE Transaction Broadcast & Telev. Receivers vol. BTR18 No. 1 Feb. 1972.

Primary Examiner—Robert Pascal
Assistant Examiner—Michael B. Shingleton
Attorney, Agent, or Firm—Robert J. Kraus

[57] ABSTRACT

Color display tube with a shadow mask, a shield of a ferromagnetic material and a demagnetizing device having a set of demagnetizing coils. The demagnetizing device is provided with means for energizing the demagnetizing coils in two steps which are shifted in time with respect to each other, while the location of the turns of the demagnetizing coils is such that upon the passage of current through only the one coil, the magnetic field generated by the coil is capable of demagnetizing those parts of color selection electrode and screen which are not demagnetized upon the passage of current through only the other coil, and conversely.

4 Claims, 4 Drawing Sheets

COLOR DISPLAY DEVICE COMPRISING A COLOR DISPLAY TUBE AND A DELAYING DEMAGNETIZING DEVICE

BACKGROUND OF THE INVENTION

The invention relates to a color display device comprising a color display tube with a rear portion having a cylindrical neck which accommodates a device for generating a plurality of electron beams, and a front portion having a truncated cone whose widest part is present at the front side, and an apertured color selection electrode manufactured of a ferromagnetic material (hereinafter generally referred to as shadow mask, or mask) and a display screen with phosphor elements, the display device being further provided with a screen of a ferromagnetic material extending substantially parallel to the surface of the truncated cone, and a demagnetizing device having a first and a second demagnetizing coil which extend along the outer circumference of the cone surface.

A color display device of this type is known from Netherlands Application 6905722 laid open to public inspection. However, such a construction, particularly for display tubes having large screen dimensions (for example, a diagonal of 66 cm) and large deflection angles (for example, 110°) appears to be unsatisfactory, particularly if wide- screen display tubes having a screen aspect ratio of 9:16 are concerned.

A screen of a ferromagnetic material (shield) is placed in a display tube, which shield, together with the mask portion which is also ferromagnetic reduces the influence of the earth's magnetic field on the picture display. When the television receiver is switched on, these components are demagnetized by means of an alternating current having a decreasing amplitude by a coil pair which is arranged on the wall of the display tube. Due to this treatment, the magnetization of the material of the shield and the mask portion is adapted to the prevailing direction of the earth's magnetic field. The invention is based on the recognition that when using a single coil, but also when using two coils, there is always a part of the shield which is not demagnetized because the applied field is not parallel to the magnetic material. Consequently the shielding action is not optimal so that the electron beams exhibit landing errors which are larger than they could have been.

SUMMARY OF THE INVENTION

It is an object of the invention to provide a display device of the kind described in the opening paragraph with an improved landing of the electron beams. To this end a device according to the invention is characterized in that the demagnetizing device is provided with means for energizing the first demagnetization coil in a first step and the second demagnetization coil in a second step, which first and second step are shifted in time with respect to each other, the location of the turns of the demagnetizing coils being such that upon the passage of current through only the one coil, the magnetic field generated by said coil is capable of demagnetizing those parts of color selection electrode and screen which are not demagnetized upon the passage of current through only the other coil, and conversely.

The invention is based, inter alia on the recognition that in conventional demagnetization devices using two coils, the two coils are operated simultaneously independent of whether they are arranged in series or in parallel. Consequently, each part of the screen and the mask is always within the total field of the two coils. As a result, the direction of the applied field does not change during demagnetization and a full demagnetization of all parts of the screen and the mask is generally not possible. By generating these two fields not exactly simultaneously, the situation described above can be enhanced. The invention is further based on the recognition that also the location of the coils plays a role in this respect. The location of the coils should preferably be such that a component of the generated field is always parallel to the metal surfaces to be demagnetized. With a location of the coils as in FIG. 1 (coils not overlapping each other) this is not possible, as will be explained hereinafter. A preferred embodiment is therefore characterized in that the coils overlap each other at the area of the neck-cone interface.

BRIEF DESCRIPTION OF THE DRAWINGS

These and other aspects of the invention will be apparent from and elucidated with reference to the embodiments described hereinafter.

In the drawing.

DESCRIPTION OF THE PREFERRED EMBODIMENT

Figure 1:
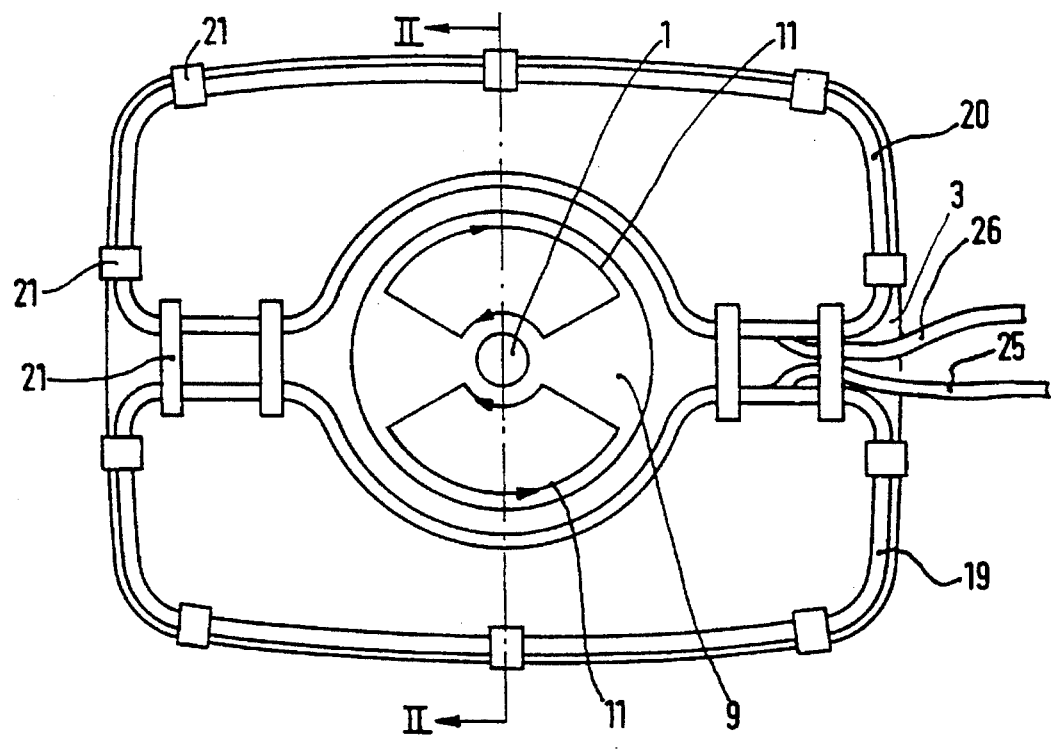
FIG. 1 is a rear view of a conventional color television display tube provided with a demagnetizing device.
Figure 2:
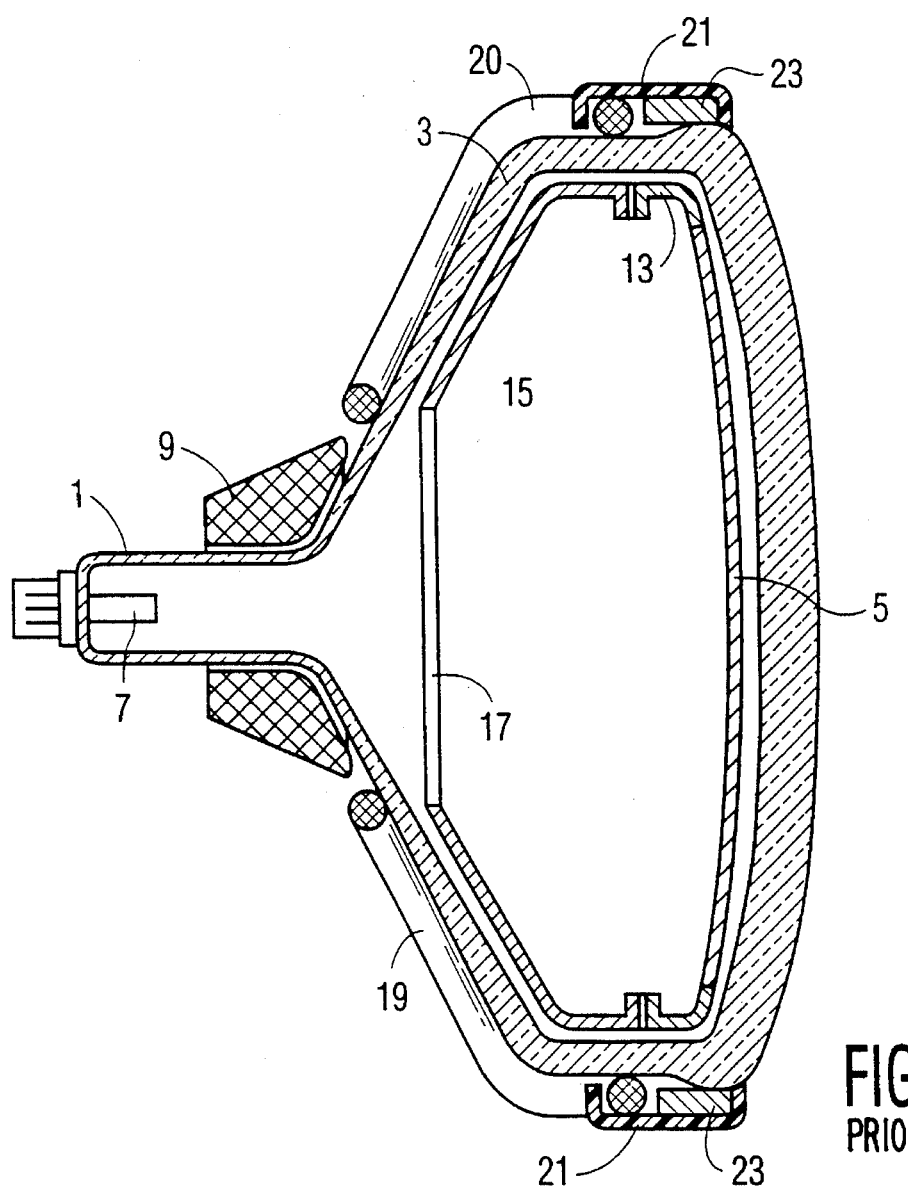
FIG. 2 is a longitudinal section of the display tube shown in FIG. 1.

FIGS. 1 and 2 show in a rear view and a longitudinal section, respectively, a color television display tube of the type described in the opening paragraph, which is provided with a demagnetizing device. For the sake of clarity, all details which are not important for understanding the invention have been omitted.

The display tube comprises a cylindrical neck 1 and a truncated cone 3 whose widest part is present at the front side of the tube and a color selection electrode 5 and a display screen (not shown).

The color selection electrode 5 has a pattern of (for example, elongated or circular) apertures. The display screen has a pattern of phosphor elements which, when impinged by electrons, luminesce in one of the colors red, green or blue. The rear part of the neck 1 accommodates three electron guns 7 (shown diagrammatically). At the area of the transition between the neck 1 and the cone 3, a deflection unit 9 shown diagrammatically is provided on the tube, which unit comprises inter alia two control deflection coils 11 for deflecting the electron beams in the horizontal direction. As is shown in FIG. 1, the control deflection coils 11 may be, for example saddle-shaped coils through which a sawtooth-shaped current at a frequency of approximately 15 kHz flows in the operating condition.

The color selection electrode 5 is suspended from a frame 13 which is secured to the tube with means which are not shown. A magnetic shield 15 is also secured to this frame, which shield extends along a large part of the inner surface of the cone 3. Both the shield 15, the frame 13 and the color selection electrode 5 are made of a material having a high magnetic permeability so that they jointly constitute a magnetic circuit within the cone 3 with the exception of an aperture 17 provided in the shield 15 for passing the electron beams.

Two demagnetizing coils 19 and 20 are arranged at the outer side of the cone 3. The demagnetizing coils 19 and 20 are secured by means of hooks 21 of a synthetic material to a metal tightening strap 23 enclosing the front part of the cone 3 and to each other. The demagnetizing coils forwardly extend as far as the front boundary of the surface of the cone 3 and backwardly as far as the deflection unit 9 allows so that they comprise a very large part of the cone surface. The demagnetizing coils 19 can be connected to a suitable power supply via connection wires 25, 26.

Figure 3:
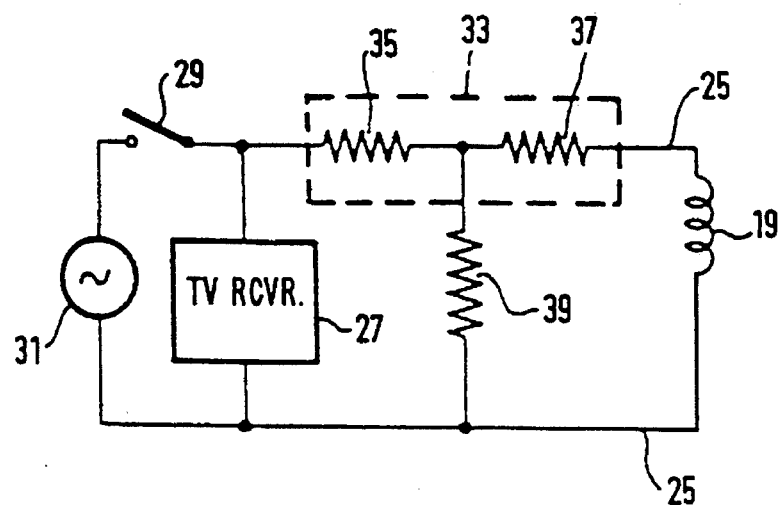
FIG. 3 is a diagram of a power supply circuit for demagnetizing coils.

A power supply circuit is shown diagrammatically in FIG. 3. A television receiver 27 is connected via a mains switch 29 to an AC voltage source 31, for example the mains. The demagnetizing coil 19 is connected to the switch 29 via the connection wires 25 and a double thermistor 33. The double thermistor 33 comprises two thermally connected resistors 35 and 37 having a high positive temperature coefficient (PTC). After the switch 29 is closed, a large current initially flows through the demagnetizing coil 19, which current gradually decreases to a very low value when the resistors 35 and 37 warm up, so that the demagnetizing coil 19 generates a decreasing magnetic field alternating with the mains frequency, which is necessary for the demagnetization of the space within the cone 3. To prevent that the resistors 35 and 37 cool down again after the current has decreased, a conducting resistor 39 is provided so that a sufficient current continues to flow through the resistors 35 and 39 to keep the double thermistor 33 at its temperature without a current of any significance flowing through the demagnetizing coil 19. In the devices hitherto known, using two demagnetizing coils, the coil 20 is always arranged in series with the coil 19.

It has been found that errors which were larger than expected occur in the landing of the electron beams when using this known configuration and arrangement of demagnetizing coils.

Figure 4:
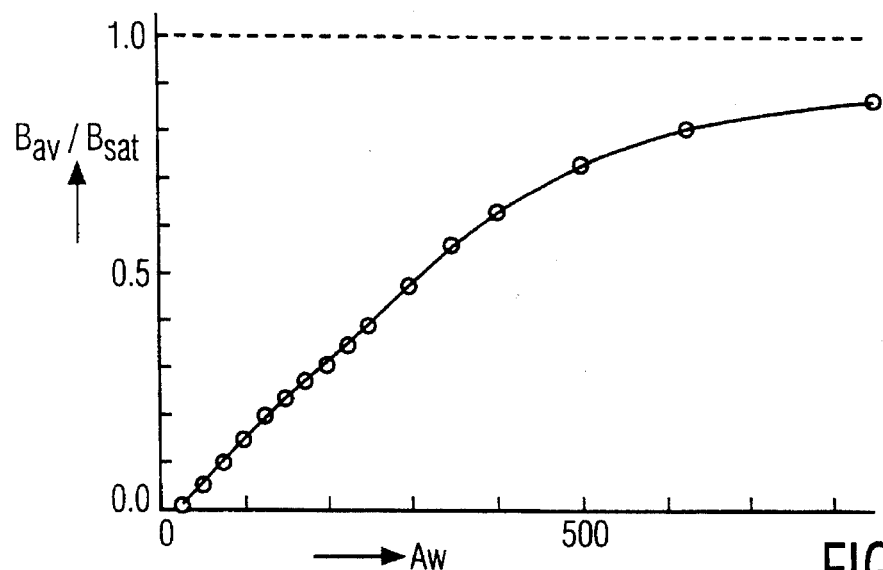
FIG. 4 is a graphic representation of the variation of the mean value of the value B (magnetic inductance) divided by the saturation value of B, Bav/Bsat as a function of the number of ampere turns Aw.

When the coils are arranged in series they are operated simultaneously, unless special measures are taken. Consequently, each screen and mask part is present both in the field of its own coil and in the field of the other coil during demagnetization. The joint field does not everywhere have a component which is parallel to the metal surface of the component to be demagnetized. Consequently a full demagnetization of all parts is generally not possible. Even an increase of the demagnetization field strength by increasing the number of ampere turns Aw to a number which is considerably higher than the conventional number of 400 (for example, 50 turns, 8A) does not appear to lead to a full demagnetization as in FIG. 4 which is representative of a 21-inch display tube with demagnetizing coils arranged and operated in accordance with FIGS. 1, 2 and 3.

Figure 5:
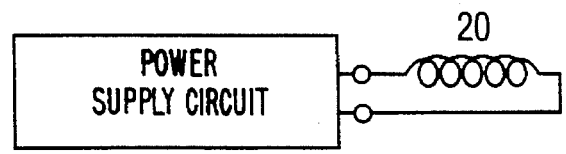
FIG. 5 is a diagram of the power supply for the demagnetizing device according to the invention.
Figure 5:
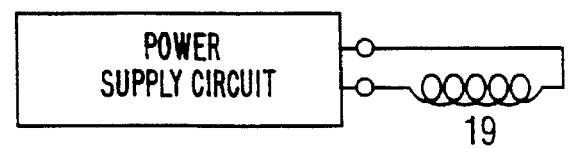

The invention provides a device for operating the coils 19, 20 in a way which is shifted in time with respect to each other instead of operating them simultaneously. Such a device may comprise, for example two separate power supply circuits, one for each coil, one of which can be switched on by means of a "time switch" at a later instant than the other (FIG. 5). For example, one of the power supply circuits may comprise a PTC device which is "on" at a later instant than the PTC device of the other power supply circuit. An alternative is that one power supply circuit comprises a PTC device and the other comprises a PTC device with a series-arranged negitive temperature coefficient (NTC) device. A further possibility is to use a "thermal switch" with a bimetal element. If the degaussing field of one coil has decreased to approximately 10%, the other coil may be switched on already. At a degaussing current reduction of 13% per half period, this will take 17 half periods, i.e. 0.17 sec after the maximum value of the current is reached. Instead of the power supply circuit described with reference to FIG. 3, other known power supply circuits may alternatively be used.

Figure 6:
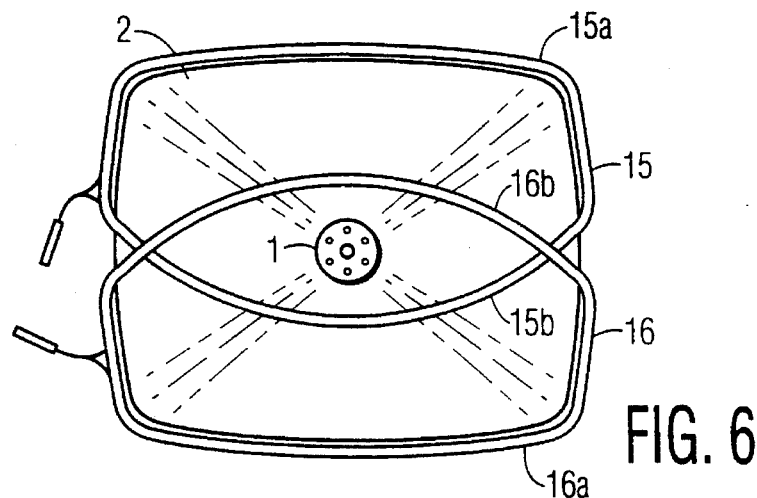
FIGS. 6 and 7 show alternative embodiments of a demagnetizing coil arrangement according to the invention.
Figure 7:
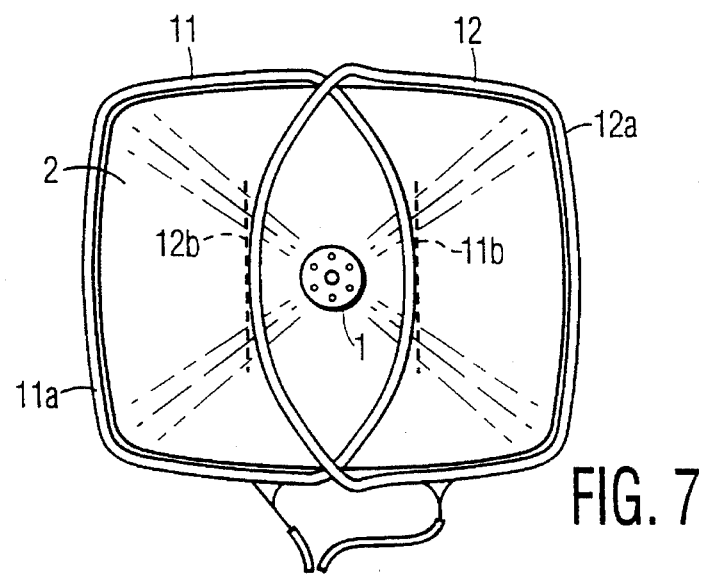

Coil arrangements which are such that the one coil is capable of demagnetizing the mask and shield parts on its own, which parts cannot be demagnetized by the other coil, and conversely, are shown in FIGS. 6 and 7 (overlapping coils 15, 16 and 11, 12, respectively).

Figure 8:
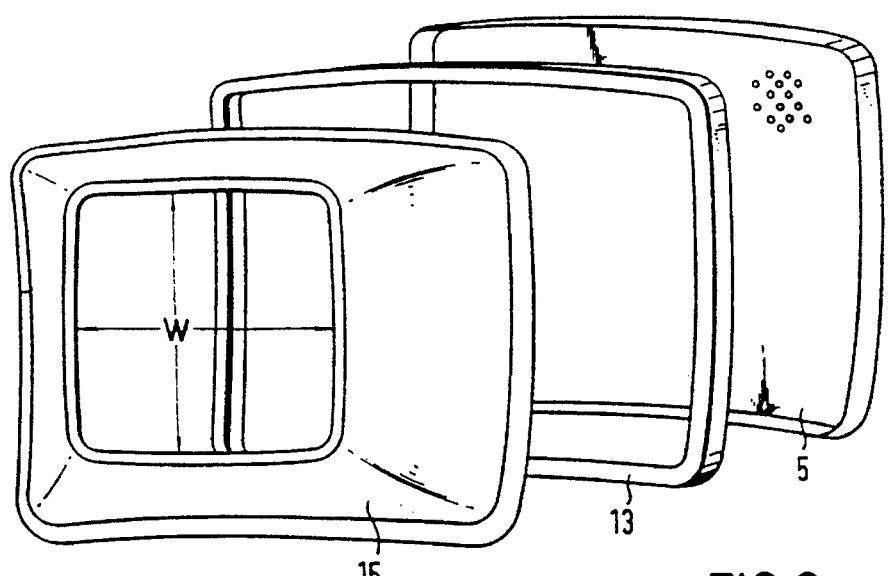
FIG. 8 is a perspective elevational view of a shadow mask, frame, shield combination as used in a display tube of the type shown in FIG. 2.

FIG. 8 is a perspective elevational view of a combination of a shadow mask 5, a frame 13 and a shield 15 to be demagnetized.

If desired, the shield 15 may be arranged outside the cone 3.

Figure 9:
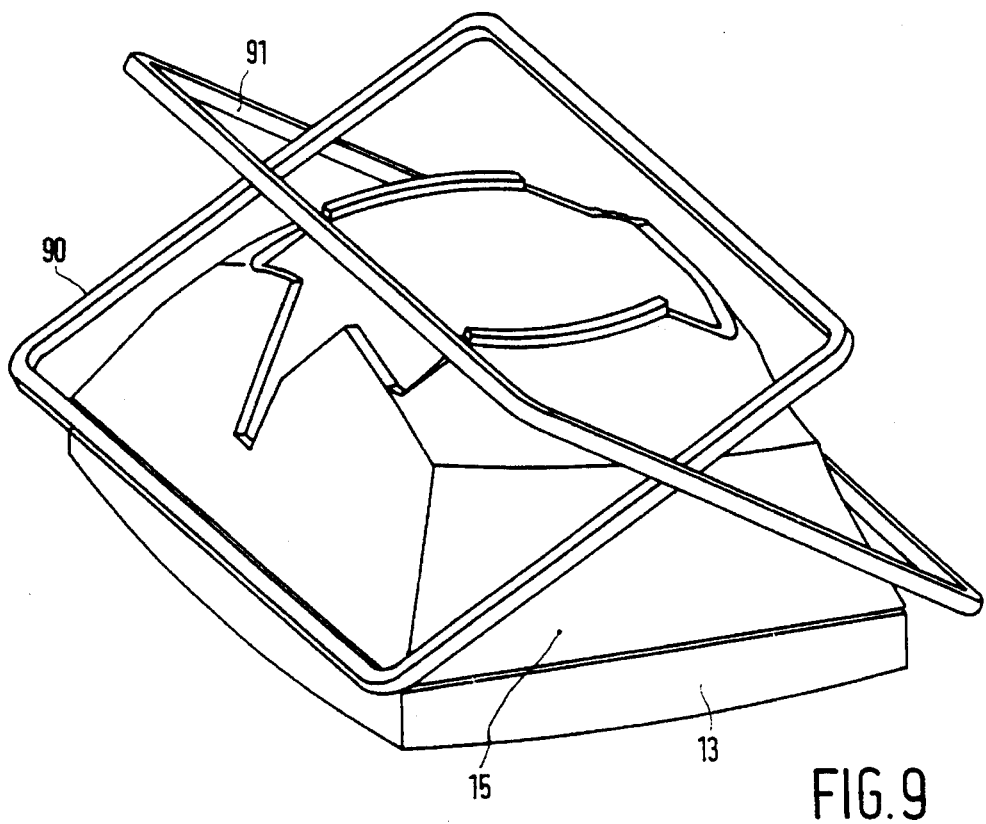
FIG. 9 is an elevational view of a shield and the location of a demagnetizing coil system according to the invention relative to the shield.

FIG. 9 is an elevational view of a shield such as the shield 15 in FIG. 8 and the positions of two degaussing coils 90, 91 with respect to the shield 15. The coils 90, 91 enclose approximately supplementary angles with the front face of the shield 15 (which is parallel to the shadow mask 5, see FIG. 8) and overlap each other in the neck area of the tube. With these "obliquely" arranged degaussing coils and with the successive energization, landing errors are found to be approximately reduced by 50% with respect to the configuration shown in FIG. 7. (The coils are arranged in such a way that they cause a field in the material to be demagnetized, which field is larger than the coercive field of the material).

I claim:

1. A color display device comprising a color display tube with a rear portion having a cylindrical neck which accommodates a device for generating a plurality of electron beams, and a front portion having a truncated cone whose widest part is present at the front side, and an apertured color selection electrode manufactured of a ferromagnetic material, and a display screen with phosphor elements, the display device being further provided with a screen of a ferromagnetic material extending substantially parallel to the surface of the truncated cone, and a demagnetizing device having a first and a second demagnetizing coil which extend along the outer circumference of the cone surface, characterized in that the demagnetizing device is provided with means for energizing the first demagnetizing coil in a first step and the second demagnetizing coil in a second step, which first and second step are shifted in time with respect to each other, the location of the turns of the demagnetizing coils being such that upon the passage of current through only the one coil, the magnetic field generated by said one coil is capable of demagnetizing those parts of said color selection electrode and screen which are not demagnetized upon the passage of current through only the other coil, and conversely.

2. A display device as claimed in claim 1, characterized in that the demagnetizing coils overlap each other in an area proximate the neck.

3. A display device as claimed in claim 1 or 2, characterized in that one demagnetizing coil is energized after the current through the other demagnetizing coil has decreased to approximately 10%.

4. A display device as claimed in claim 1, characterized in that the display screen has an aspect ratio of approximately 9:16.

* * * * *